United States Patent
Uchidani et al.

(10) Patent No.: US 11,326,875 B2
(45) Date of Patent: May 10, 2022

(54) METHOD, DEVICE AND STORAGE MEDIUM FOR EVALUATING PRODUCTION PRECISION OF SPECTACLE LENS

(71) Applicant: HOYA LENS THAILAND LTD., Pathumthani (TH)

(72) Inventors: Takahiro Uchidani, Tokyo (JP); Hua Qi, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 374 days.

(21) Appl. No.: 16/725,968

(22) Filed: Dec. 23, 2019

(65) Prior Publication Data

US 2020/0132441 A1  Apr. 30, 2020

Related U.S. Application Data (63) Continuation of application No. PCT/JP2019/014230, filed on Mar. 29, 2019.

(30) Foreign Application Priority Data

Mar. 29, 2018 (JP) .............................. JP2018-064924

(51) Int. Cl.
*G01B 11/255* (2006.01)
*G02C 7/02* (2006.01)
(Continued)

(52) U.S. Cl.
CPC ............ *G01B 11/255* (2013.01); *G02C 7/022* (2013.01); *G02C 7/028* (2013.01); *G02B 1/11* (2013.01);
(Continued)

(58) Field of Classification Search
CPC ...... G02C 7/02; G02C 2202/24; G02C 7/022; G02C 7/00; G02C 7/028; G01B 11/255; G01B 11/24; G02B 1/14; G02B 1/11
(Continued)

(56) References Cited

U.S. PATENT DOCUMENTS

| 6,222,621 B1 | 4/2001 | Taguchi |
| 2003/0107702 A1 | 6/2003 | Yamakaji |

(Continued)

FOREIGN PATENT DOCUMENTS

| JP | 2008-299168 A | 12/2008 |
| WO | 2002/088828 A1 | 11/2002 |

OTHER PUBLICATIONS

PCT/JP2019/014230, English translation of International Search Report, 1 page.
(Continued)

*Primary Examiner* — William R Alexander
(74) *Attorney, Agent, or Firm* — Kilpatrick Townsend & Stockton LLP (57) ABSTRACT

Provided is a method for evaluating production precision of a spectacle lens having micro convex segments protruding from a convex surface on an object side of the spectacle lens, including measuring a shape of the convex surface of the spectacle lens; setting an actual device virtual model including a spectacle lens model based on the measured shape and an eyeball model; performing ray tracing calculation on the actual device virtual model and specifying an actual device convergence position where light rays converge on an front side of a retina of the eyeball model; and evaluating production precision of the spectacle lens on the basis of the actual device convergence position.

20 Claims, 8 Drawing Sheets

(51) Int. Cl.
*G02B 1/14* (2015.01)
*G02B 1/11* (2015.01)

(52) U.S. Cl.
CPC .................. *G02B 1/14* (2015.01); *G02C 7/02* (2013.01); *G02C 2202/24* (2013.01)

(58) Field of Classification Search
USPC ...................................................... 351/159.73
See application file for complete search history.

(56) References Cited

U.S. PATENT DOCUMENTS

| | | | |
|---|---|---|---|
| 2005/0041205 A1 | 2/2005 | Yamakaji | |
| 2007/0019154 A1* | 1/2007 | Perel | G02C 7/042 351/159.41 |
| 2009/0021693 A1* | 1/2009 | Sessner | G02C 13/005 351/204 |
| 2016/0161765 A1* | 6/2016 | Kozu | G02C 7/061 351/159.75 |
| 2016/0306192 A1* | 10/2016 | Marshall | G02B 3/0043 |
| 2017/0131567 A1 | 5/2017 | To | |
| 2017/0336654 A1* | 11/2017 | Seitz | G02C 13/005 |

OTHER PUBLICATIONS

EP19778206.3, "Extended European Search Report", dated Nov. 22, 2021, 10 pages.

\* cited by examiner

METHOD, DEVICE AND STORAGE MEDIUM FOR EVALUATING PRODUCTION PRECISION OF SPECTACLE LENS

CROSS REFERENCE TO RELATED APPLICATIONS

This application is a continuation of International Application No. PCT/JP2019/014230 filed Mar. 29, 2018, which claims priority to Japanese Patent Application No. 2018-064924 filed Mar. 29, 2018, and the contents of which is incorporated by reference in its entirety.

TECHNICAL FIELD

The present disclosure relates to a method for evaluating the production precision of a spectacle lens, and relates particularly to a method for evaluating the production precision of a spectacle lens in which micro convex segments protruding from an object side surface on the object side of the spectacle lens are formed on the object side surface.

BACKGROUND ART

In Patent Literature 1 (US 2017/131567A), a spectacle lens that suppresses the progress of ametropia such as myopia by forming, on a convex surface on the object side of the spectacle lens, micro convex segments in spherical shapes each with a diameter of approximately 1 mm, for example, is produced. Thus, when light that has passed through the convex surface comes to a focus on the retina, light that has passed through the micro convex segments comes to a focus on the front side; therefore, the progress of myopia is hindered.

CITATION LIST

Patent Literature

Patent Literature 1: US 2017/131567A

SUMMARY OF DISCLOSURE

Meanwhile, in such a spectacle lens in which micro convex segments are formed on a convex surface, the difference in refractive power between the convex surface and the micro convex segment is decided on by the curved surface shape of the surface of the spectacle lens and the curved surface shape of the micro convex segment. However, if a hard coat layer or an AR layer is provided on the surface of the spectacle lens, there is a concern that the micro convex segments will get buried in these layers and desired refractive power will not be obtained. Hence, it is desired to evaluate whether the produced spectacle lens has desired optical performance or not; however, there has been no method for inspecting whether desired optical characteristics have been obtained or not.

The present disclosure has been made in view of the problem mentioned above, and an aspect of the present disclosure is to provide a method for evaluating a spectacle lens in which micro convex segments are formed on a surface on the object side.

According to an embodiment of the present disclosure, there is provided a method for evaluating production precision of a spectacle lens in which micro convex segments protruding from an object side surface on an object side of the spectacle lens are formed on the object side surface, the method including: a shape measurement step of measuring a shape of the object side surface of the spectacle lens; an actual device virtual model setting step of setting an actual device virtual model including a spectacle lens model based on the measured shape and an eyeball model; an actual device convergence position specification step of performing ray tracing calculation on the actual device virtual model and specifying an actual device convergence position where light rays converge on a front side of a retina of the eyeball model; and an evaluation step of evaluating production precision of the spectacle lens on the basis of the actual device convergence position.

According to the above Example, the shape of an object side surface of a spectacle lens is measured, an actual device virtual model is set on the basis of the measured shape, and an actual device convergence position in the actual device virtual model is specified; thereby, whether the spectacle lens has desired optical performance or not can be evaluated.

According to the present disclosure, a method for evaluating a spectacle lens in which micro convex segments are formed on a surface on the object side can be provided.

DESCRIPTION OF EMBODIMENTS

Figure 1:
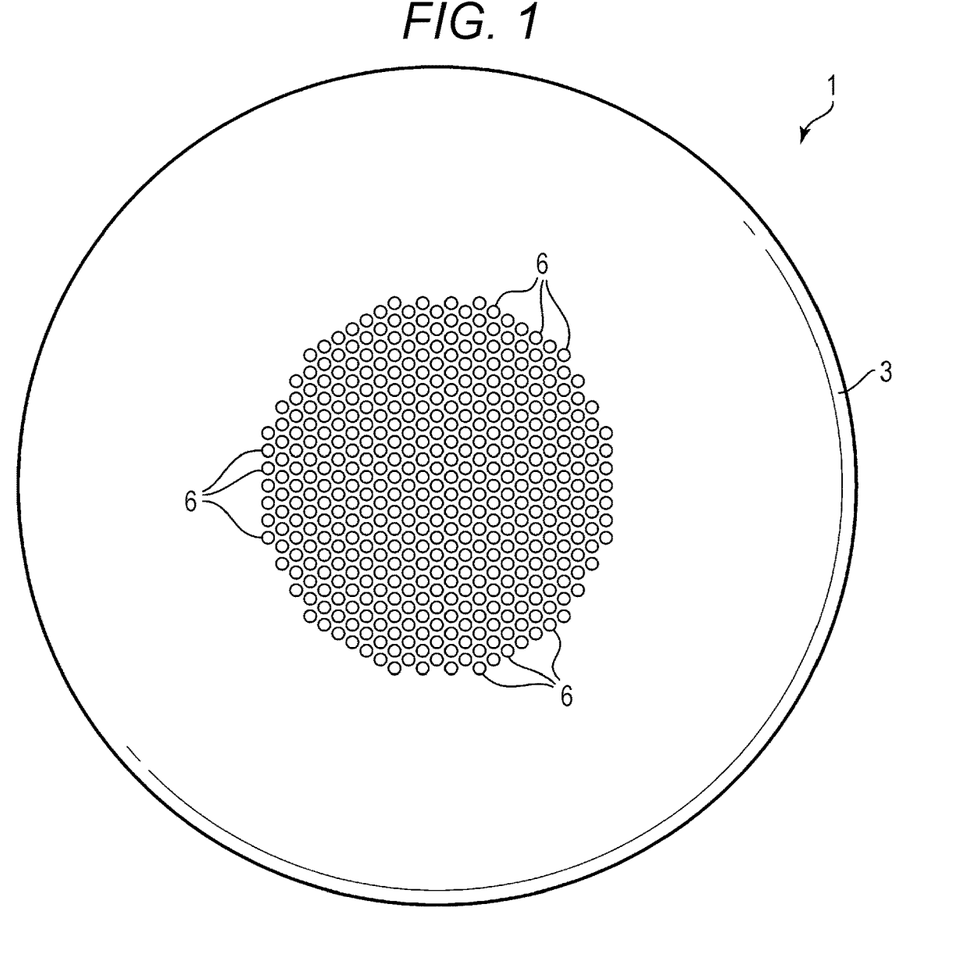
FIG. 1 is a front view showing the shape of a spectacle lens serving as an object of a method for evaluating production precision of the present embodiment.
Figure 2:
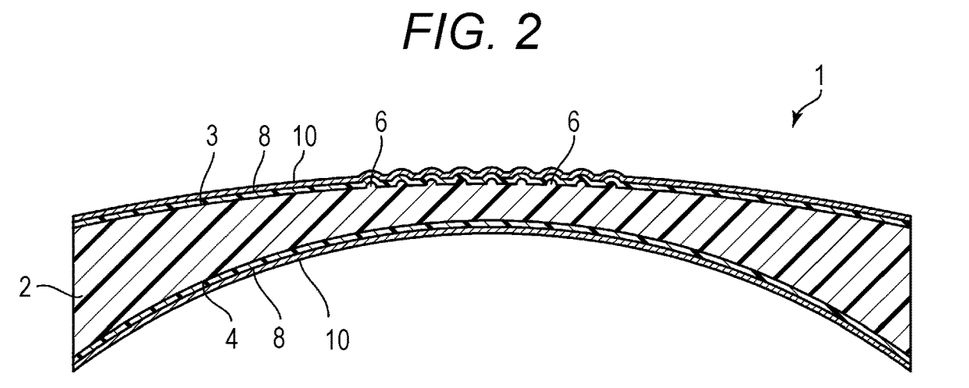
FIG. 2 is a cross-sectional view of the spectacle lens shown in FIG. 1.

Hereinbelow, a first embodiment of a method for evaluating the production precision of a spectacle lens of the present disclosure is described in detail with reference to the drawings. FIG. 1 is a front view showing the shape of a spectacle lens serving as an object of a method for evaluating production precision of the present embodiment. FIG. 2 is a cross-sectional view of the spectacle lens shown in FIG. 1. In FIG. 2, a diagram in which the number of convex segments formed on a convex surface is reduced is shown for convenience of description.

As shown in FIG. 1, a spectacle lens 1 includes a spectacle lens main body 2, and the spectacle lens main body 2 has a convex surface 3 on the object side and a concave surface 4 on the eyeball side. The spectacle lens 1 further includes hard coat layers 8 formed on the convex surface 3 and the concave surface 4 of the spectacle lens main body 2 and an antireflection film (AR film) 10 formed on the surface of each hard coat layer 8.

On the convex surface (base surface) 3 of the spectacle lens main body 2, micro convex segments (segments) 6 are formed at equal intervals in the circumferential direction and the axial direction around the center axis. The surface of the convex segment 6 is a spherical surface with a diameter of 1 mm, a height of 0.8 μm, and a curvature of 86 mmR, for example.

The spectacle lens main body 2 is made of, for example, a thermosetting resin such as a thiourethane, allyl, acrylic, or epithio resin. Also other resins whereby desired refractivity is obtained may be selected as a resin that forms the spectacle lens main body 2.

As the hard coat layer 8, for example, a thermoplastic resin or a UV-curable resin may be used. The hard coat layer 8 can be formed by using a method of immersing the spectacle lens main body 2 in a hard coat liquid, spin coating, or the like.

The antireflection film 10 is formed by, for example, forming a film out of an antireflection agent such as $ZrO_2$, $MgF_2$, or $Al_2O_3$ by vacuum vapor deposition.

Figure 3:
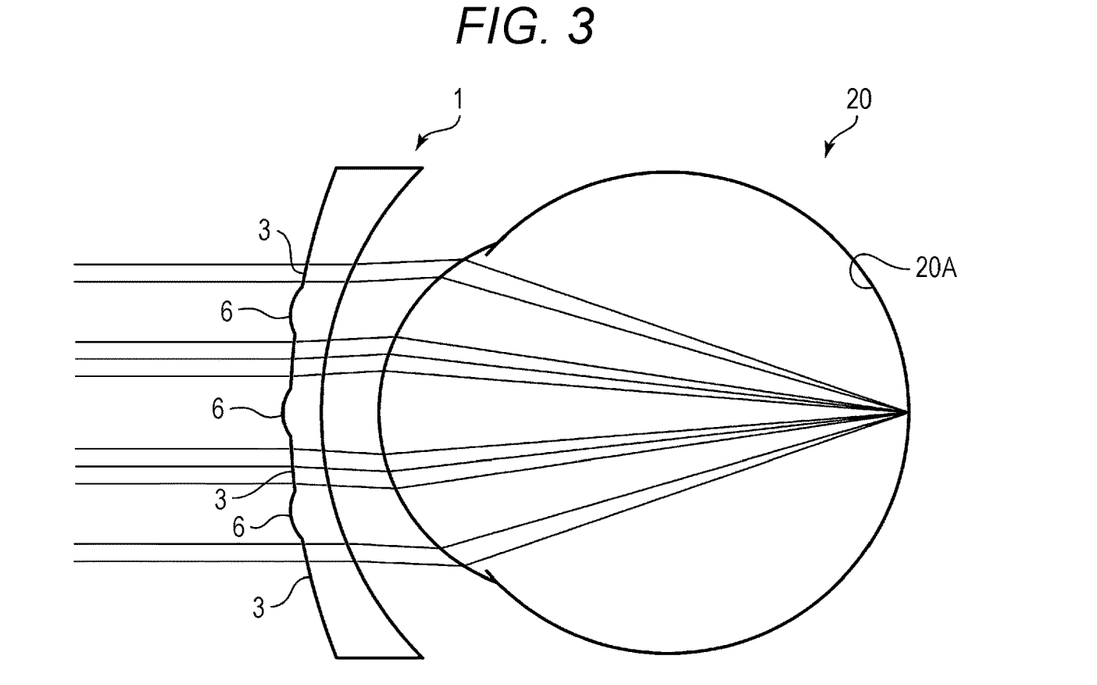
FIG. 3 is a diagram for describing a principle of suppressing the progress of ametropia such as myopia by the spectacle lens shown in FIG. 1, and shows paths of light incident on a convex surface.
Figure 4:
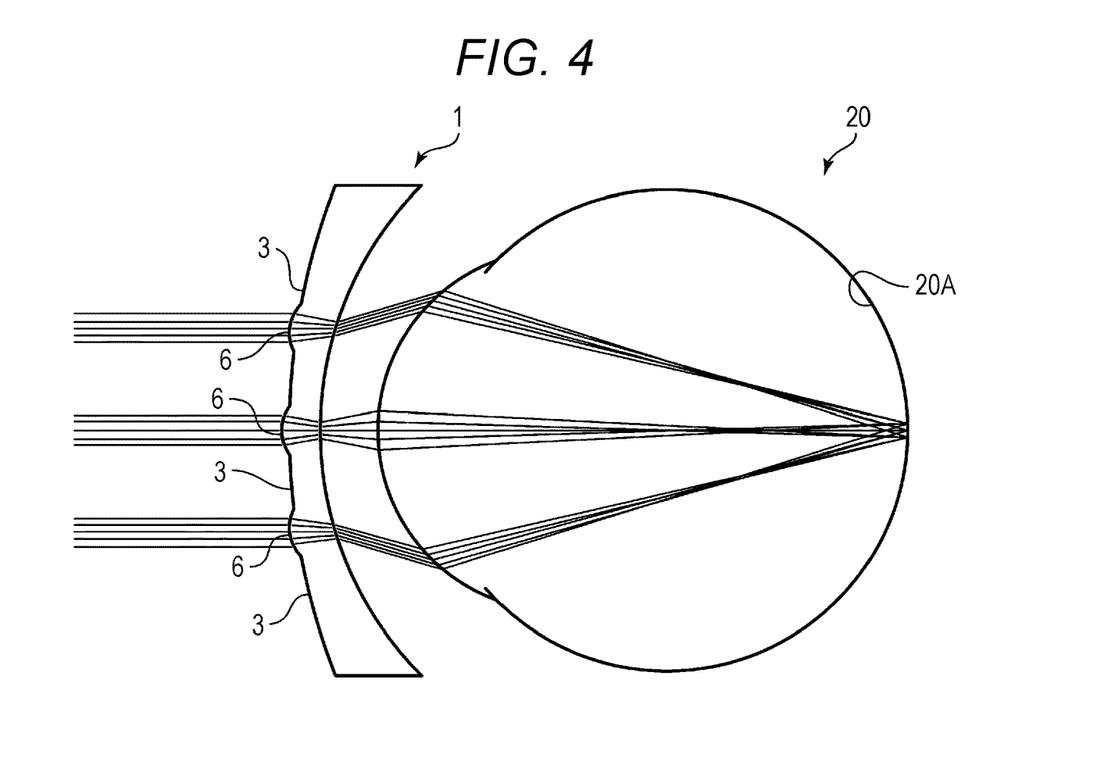
FIG. 4 is a diagram for describing a principle of suppressing the progress of ametropia such as myopia by the spectacle lens shown in FIG. 1, and shows paths of light incident on a convex segment.

As written in Patent Literature 1 described above, it is known that the progress of ametropia such as myopia of a spectacle wearer can be suppressed by forming, on the convex surface (object side surface) 3 of the spectacle lens 1, micro convex segments (segments) 6 in spherical surface shapes each with a curvature different from the curvature of the convex surface. FIG. 3 and FIG. 4 are diagrams for describing a principle of suppressing the progress of ametropia such as myopia by the spectacle lens shown in FIG. 1; FIG. 3 shows paths of light incident on the convex surface, and FIG. 4 shows paths of light incident on convex segments. As shown in FIG. 3, light incident on the convex surface 3 of the spectacle lens 1 converges on a retina 20A of an eyeball 20. In contrast, as shown in FIG. 4, light incident on convex segments 6 of the spectacle lens 1 converges in front of the retina 20A. Thus, the progress of myopia is suppressed by placing a focus also in a position other than the retina 20A.

Here, it may be desired for the refractive power of the micro convex segment 6 to be larger than the refractive power of a portion other than the convex segment 6 of the spectacle lens 1 (hereinafter, referred to as a base section) by 2.00 to 5.00 diopters. Further, it may be desired for the diameter of the micro convex segment 6 to be approximately 0.8 to 2.0 mm. The refractive power of the base section of the spectacle lens 1 is decided on by the refractive index of the material, the curve (curvature radius) of the convex surface 3, the curve (curvature radius) of the concave surface 4, and the wall thickness of the spectacle lens 1. Hence, it may be desired for the curve (curvature radius) of the micro convex segment 6 and the wall thickness thereof (the height of the micro convex segment 6) to be determined such that the refractive power of the micro convex segment 6 is larger than the refractive power of the base section of the spectacle lens 1 by 2.00 to 5.00 diopters. Specifically, it may be desired that the height of the micro convex segment 6 be 0.1 to 10 μm and the curvature of the micro convex segment 6 be 50 to 250 mmR. Further, the distance between a micro convex segment 6 and a micro convex segment 6 that are adjacent is preferably approximately equal to the value of the radius of the micro convex segment 6. Further, it may be desired that a plurality of micro convex segments 6 be arranged almost uniformly near the center of the lens.

Next, a method for inspecting such a spectacle lens is described.

Figure 5:
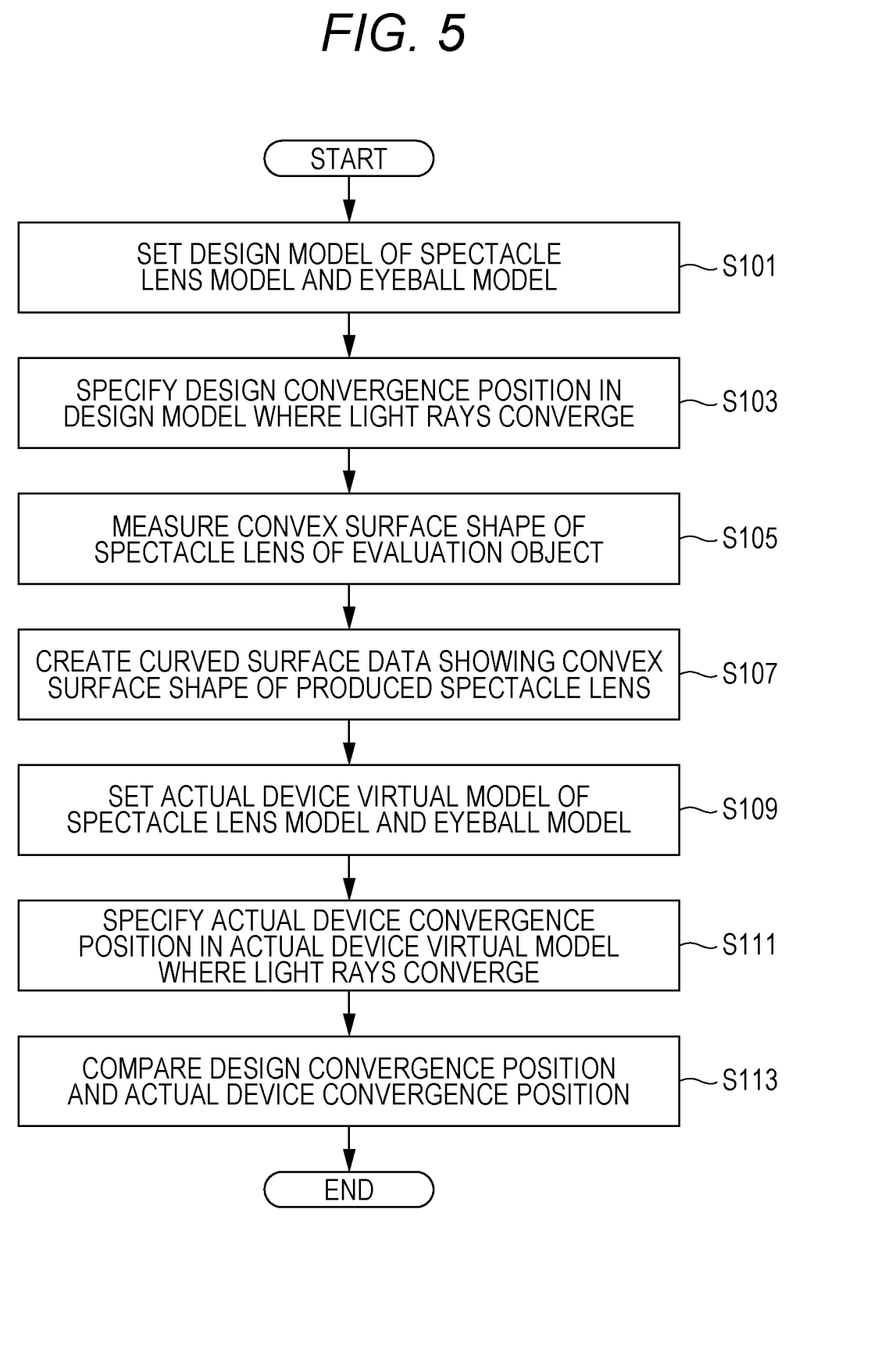
FIG. 5 is a flow chart showing a sequence of a method for inspecting a spectacle lens according to the present embodiment.

FIG. 5 is a flow chart showing a sequence of a method for inspecting a spectacle lens according to the present embodiment.

Figure 6:
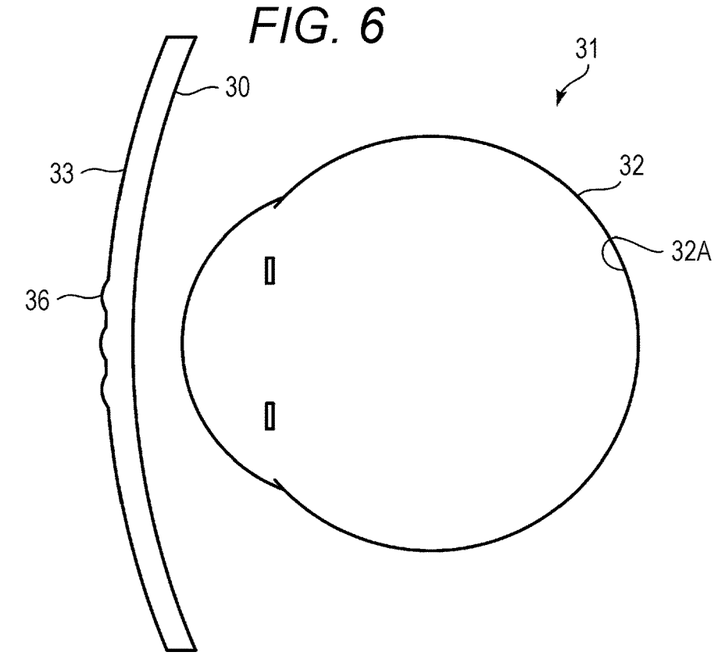
FIG. 6 is a diagram showing a design model installed on the basis of design information.

As shown in FIG. 5, first, in step 101, a design model in which a spectacle lens model with micro convex segments formed thereon and an eyeball model are arranged in a virtual space is set on the basis of design information of the spectacle lens (a design model setting step). FIG. 6 is a diagram showing a design model installed on the basis of design information. As shown in FIG. 6, a design model 31 includes a spectacle lens model 30 and an eyeball model 32. The axial length of the eye and the amount of adjustment of the eyeball model 32 are set by envisaging an eyeball not needing correction. The axial length of the eye of an eyeball not needing correction is generally 23 mm to 26 mm, and hence the setting may be made within this range. In step 103 described later, ray tracing processing is performed for light rays emitted from a physical object point at infinite distance; hence, in step 101, the amount of adjustment of the eyeball model 32 is set to 0.

A model in which micro convex segments 36 are formed on a surface (object side surface) 33 on the basis of design information is set as the spectacle lens model 30. A spectacle lens having no dioptric power (plano lens) is envisaged for the surface shape of the spectacle lens model 30. Specifically, a spectacle lens having a flat surface or a curve with an S dioptric power of 0.00 diopter and a C dioptric power of 0.00 diopter is envisaged. For the shape of the convex segment 36 of the spectacle lens model, the curvature and the placement are set on the basis of design information of the spectacle lens. In step 101, the spectacle lens model 30 with respect to the eyeball model 32 may be placed in view of the slopes (the pantoscopic angle and the face form angle) of the spectacle lens as of when mounted in the frame.

Next, in step 103, a design convergence position in the design model 31 where light rays to the retina 32A converge most is specified by ray tracing processing (a design convergence position specification step). Specifically, PSFs (point spread functions) in arbitrary planes of the design model 31 each showing a luminance distribution based on light rays that have been emitted from a point light source at infinite distance and have passed through the spectacle lens model are found. The PSF is obtained by tracing a large number of light rays radiated from the point light source and calculating the density of spots on the arbitrary plane. Then, the PSFs of the plurality of arbitrary planes are compared, and a position (plane) where light rays collect most among the plurality of arbitrary planes is specified. The diameter of the light rays may be set on the basis of a trend diameter, and may be, for example, 4 φ.

Figure 7:
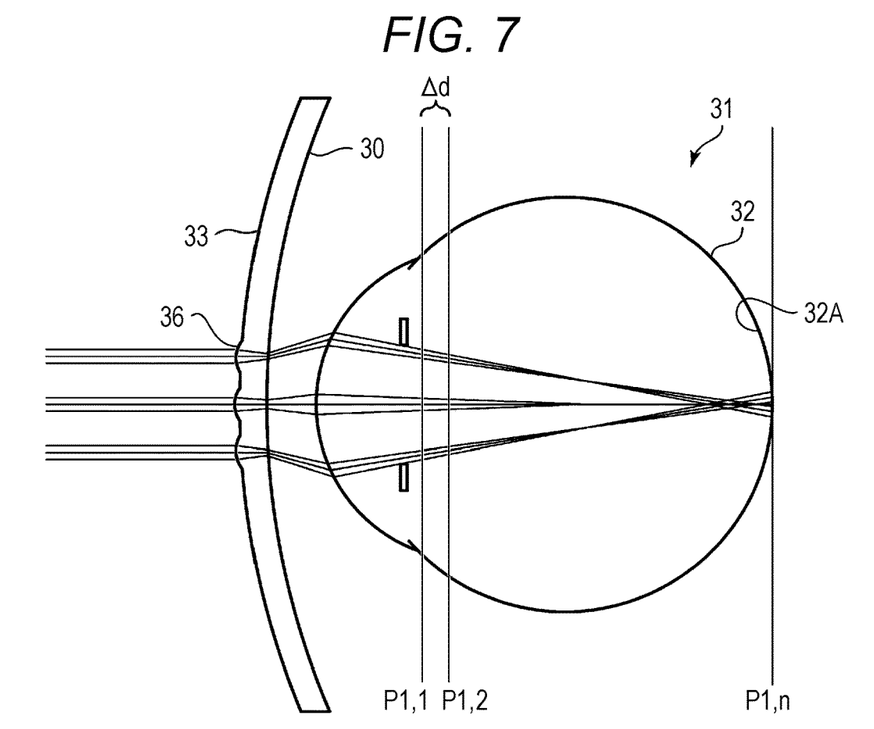
FIG. 7 is a diagram (part 1) for describing a method for specifying a position where light rays collect.
Figure 8:
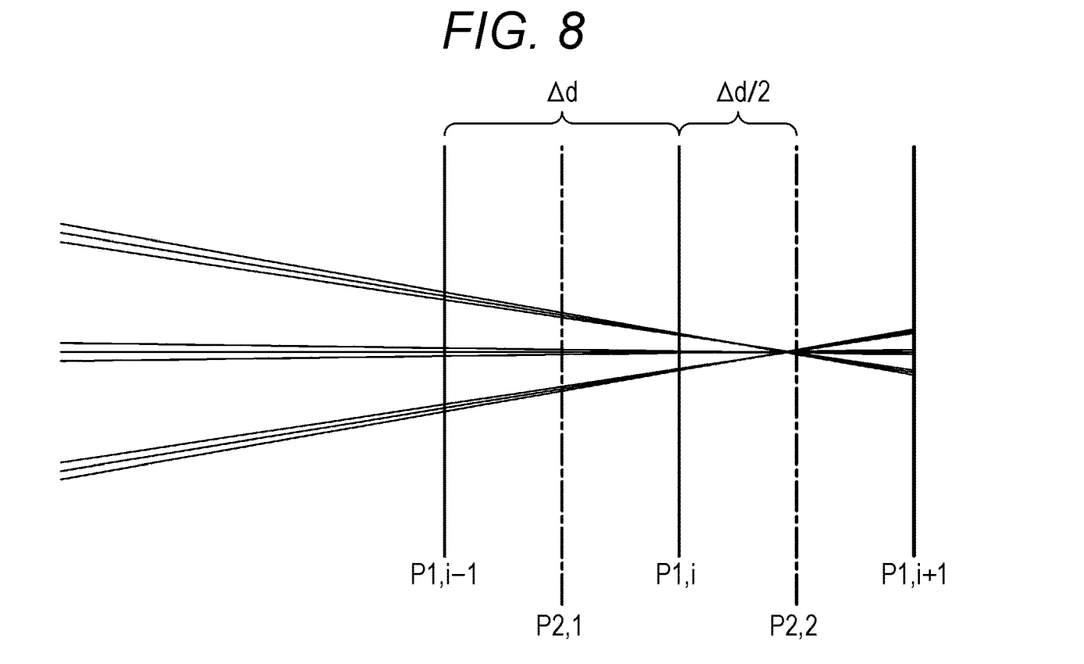
FIG. 8 is a diagram (part 2) for describing a method for specifying a position where light rays collect.
Figure 9:
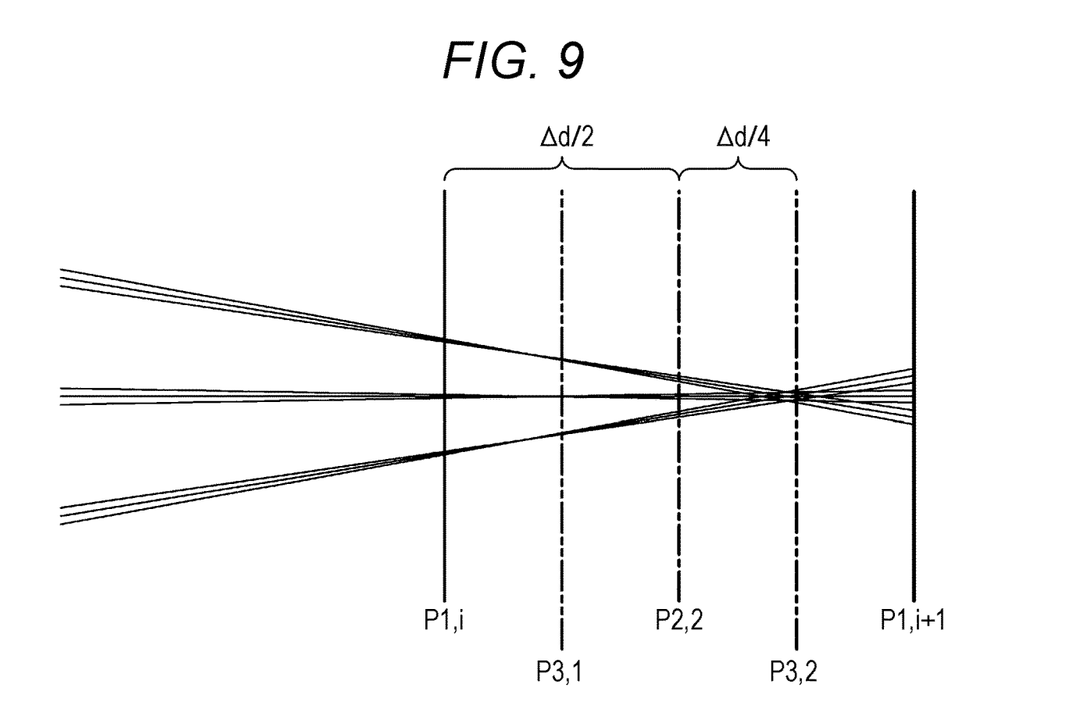
FIG. 9 is a diagram (part 3) for describing a method for specifying a position where light rays collect.
Figure 10:
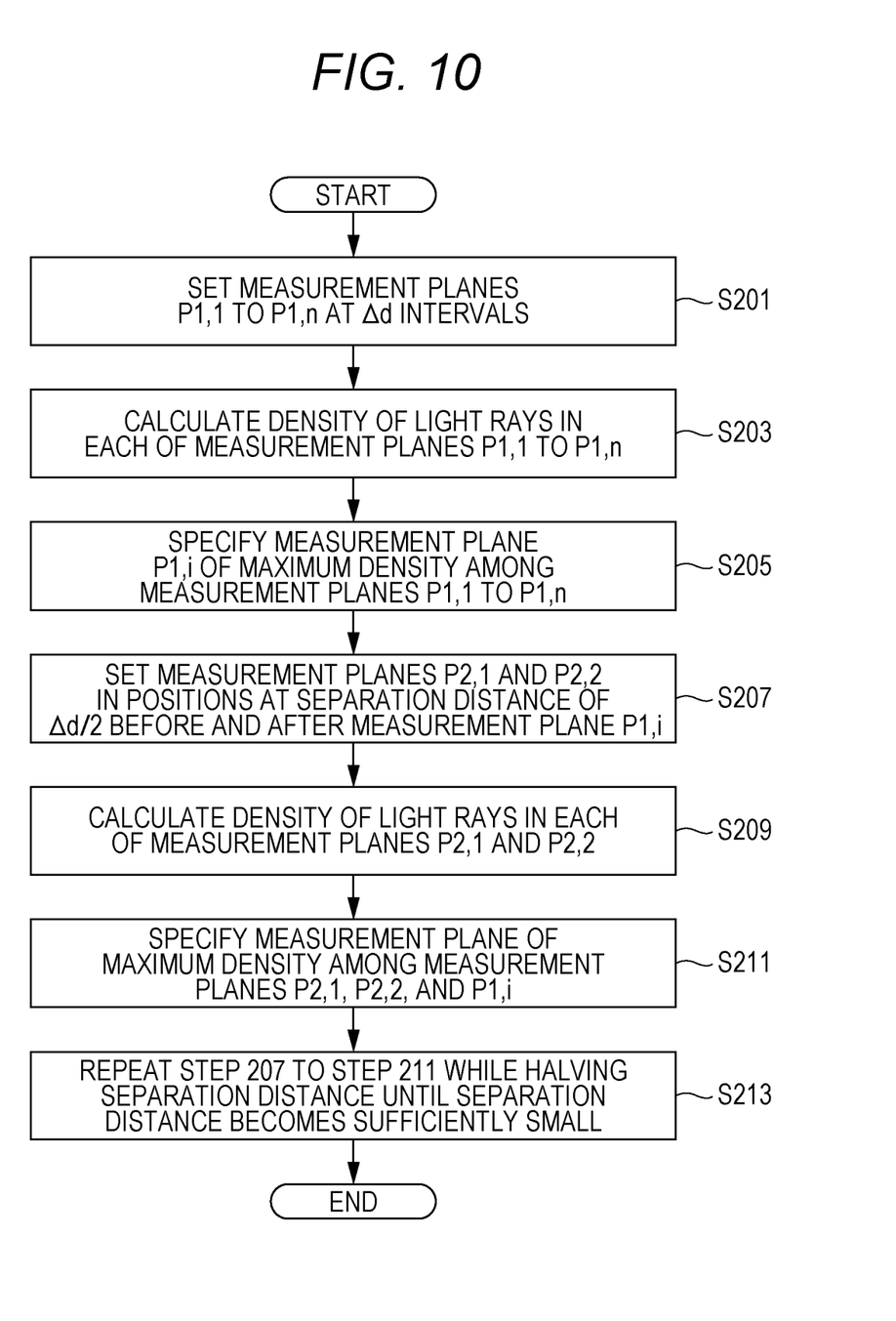
FIG. 10 is a flow chart showing a method for specifying a position where light rays collect.

Here, a method for specifying a position where light rays collect most in step 103 is described in more detail. FIG. 7 to FIG. 9 are diagrams for describing a method for specifying a position where light rays collect. FIG. 10 is a flow chart showing a method for specifying a position where light rays collect.

First, as shown in FIG. 7, in step 201, measurement planes P1,1 to P1,n are set at intervals of a prescribed separation spacing Δd (for example, 0.1 mm) from a prescribed distance (for example, a position of approximately 16 mm, which is the thickness of the vitreous body of the eyeball)

from the 0-mm position on the retina 32A of the eyeball model 32 to the retina 32A. The separation spacing Δd may be a spacing of 0.2 mm, or may be 1/50 of the eye axis.

Next, in step 203, ray tracing processing is performed, and the density of light rays in each of measurement planes P1,1 to P1,$n$ is calculated. The density of light rays may be calculated by, for example, setting a lattice-like grid in each measurement plane and calculating the number of light rays passing through each grid.

Next, in step 205, measurement plane P1,$i$ of the first maximum density from the prescribed distance mentioned above among measurement planes P1,1 to P1,$n$ is specified in order to specify a measurement plane where the light rays incident on the convex segments are at the maximum density. In order to omit calculation, the calculation of the present step may be discontinued at a time when, after the calculation of the density of light rays is started from measurement plane P1 and the first maximum value is detected, the calculation value of the density of light rays has decreased up to an approximately middle value between the value in measurement plane P1 and the first maximum value.

Next, as shown in FIG. 8, in step 207, measurement plane P2,1 and measurement plane P2,2 are set in positions at a separation distance of Δd/2 before and after measurement plane P1,$i$ of the maximum density. Then, in step 209, the density of light rays in each of measurement plane P2,1 and measurement plane P2,2 is calculated. Next, in step 211, the measurement plane of the maximum density among measurement plane P2,1, measurement plane P2,2, and measurement plane P1,$i$ is specified.

After that, in step 213, processes similar to step 207 to step 211 are repeated until the separation distance becomes sufficiently small. That is, a process in which, as shown in FIG. 9, new measurement planes (in FIG. 9, P3,1 and P3,2) are set in positions at a new separation distance (in FIG. 9, Δd/4) of a half of the preceding separation distance before and after the measurement plane that had the maximum density immediately before (in FIG. 9, P2,2), a process in which the density of light rays in each of the new measurement planes is calculated, and a process in which the measurement plane of the maximum among the measurement plane that had the maximum density immediately before and the new measurement planes is specified are repeated.

A position where light rays collect can be specified by the above processes.

Next, in step 105, the shape of the convex surface 3 of the spectacle lens 1 produced in the above manner (hereinafter, referred to as an actual device) is measured, and curved surface data showing the shape of the convex surface 3 are created (a shape measurement step). The shape of the convex surface 3 is measured with, for example, a non-contact three-dimensional microscope that performs length measurement by utilizing interference of light. The three-dimensional shape of the convex surface 3 is acquired as, for example, discrete three-dimensional data (x, y, z).

Next, in step 107, curved surface data showing the convex surface shape of the actual device are generated from the obtained data showing the convex surface shape of the spectacle lens 1. In the case where discrete three-dimensional data are used as data showing the convex surface shape of the spectacle lens 1, a set of B-spline curves may be generated, for example. In the case where there is noise in the measured discrete three-dimensional data, moving average processing may be performed and the average value may be used, for example.

Figure 11:
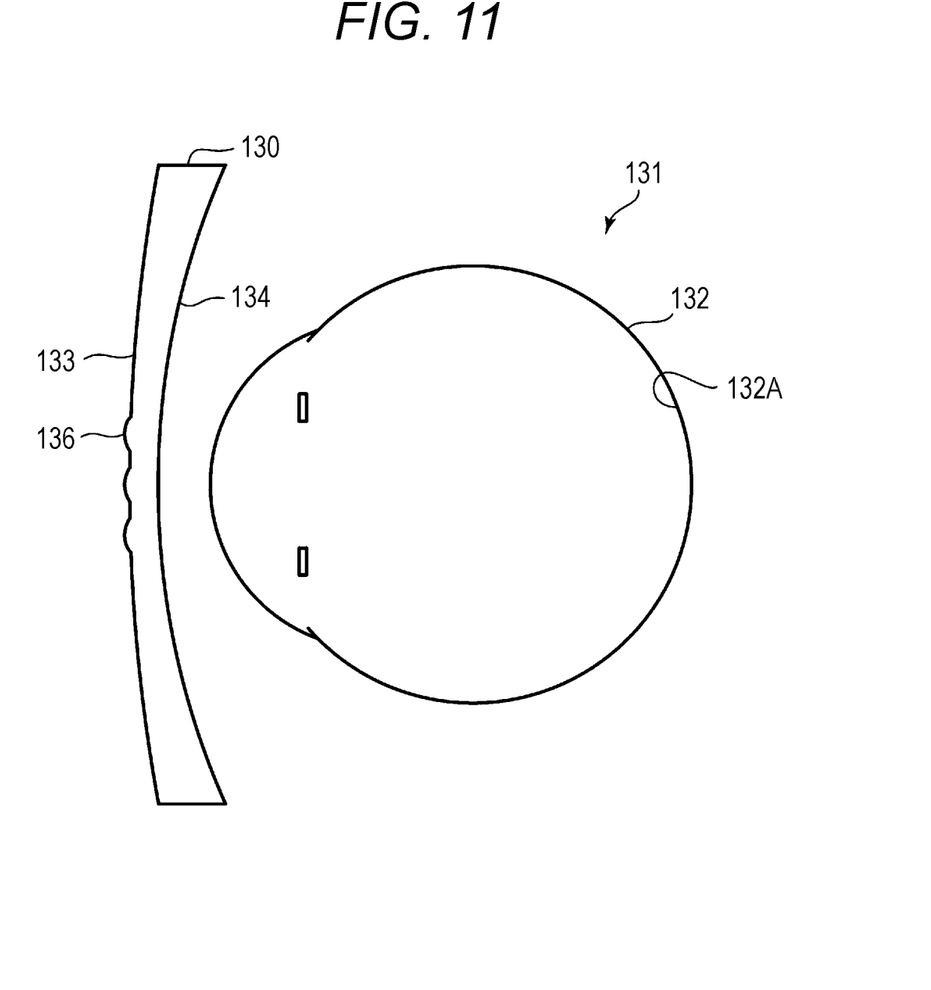
FIG. 11 is a diagram showing a set actual device virtual model.

Next, in step 109, an actual device virtual model including a spectacle lens model of the actual device in which micro convex segments are formed on a convex surface and an eyeball model is set (an actual device virtual model setting step). FIG. 11 is a diagram showing a set actual device virtual model. An actual device virtual model 131 includes an eyeball model 132 and a spectacle lens model 130 placed in front of the eyeball model 132. The eyeball model 132 is set on the basis of prescription data of the spectacle lens of the evaluation object. Specifically, the axial length of the eye and the amount of adjustment are set as parameters of the eyeball model 132 on the basis of the prescription data. For example, when the S dioptric power is −8 diopter, the axial length of the eye may be set within the range of approximately 26 to 29 mm. In step 111 described later, ray tracing calculation is performed for light rays emitted from a point light source at infinite distance; hence, in step 109, the amount of adjustment is set to 0 like in step 101. In the spectacle lens model 130, the surface shape of a convex surface 133 is set on the basis of the curved surface data generated in step 107. The surface shape of a concave surface 134 is set on the basis of prescription data of the spectacle lens 132. Like in step 101, the spectacle lens model 130 may be placed with respect to the eyeball model 132 in view of the slopes (the pantoscopic angle and the face form angle) of the spectacle lens 130 as of when mounted in the frame.

Next, in step 111, an actual device convergence position in the actual device virtual model 131 where light rays to the retina converge most is specified by ray tracing calculation (an actual device convergence position specification step). The specification of a position where light rays converge most in step 131 may be performed in a similar manner to step 103.

Next, in step 113, the design convergence position specified in step 103 and the actual device convergence position specified in step 111 are compared, and it is evaluated whether the spectacle lens of the actual device satisfies desired optical performance or not, that is, whether the spectacle lens of the actual device has the function (optical performance) of causing an image to be formed in a desired position on the front side of the retina or not (an evaluation step). Specifically, when the difference between the distance from the retina of the design convergence position specified in step 103 and the distance from the retina of the actual device convergence position specified in step 111 is within a prescribed permissible range, it is assessed that the spectacle lens of the evaluation object satisfies desired optical performance. For the permissible range of the actual device convergence position, when, for example, the difference between the design convergence position and the actual device convergence position is within ±0.1 mm (±0.5 diopters), the difference is assessed as within the permissible range, in view of the fact that, when it is assumed that the refractive power of the eyeball is 60 D when the addition power of design information of the spectacle lens is 3.00 diopter, a focus is placed approximately (1/60−1/(60+3))× 1000=0.8 mm on the front side of the retina in pre-processing.

The production precision of the spectacle lens can be evaluated by the above processes.

Figure 12:
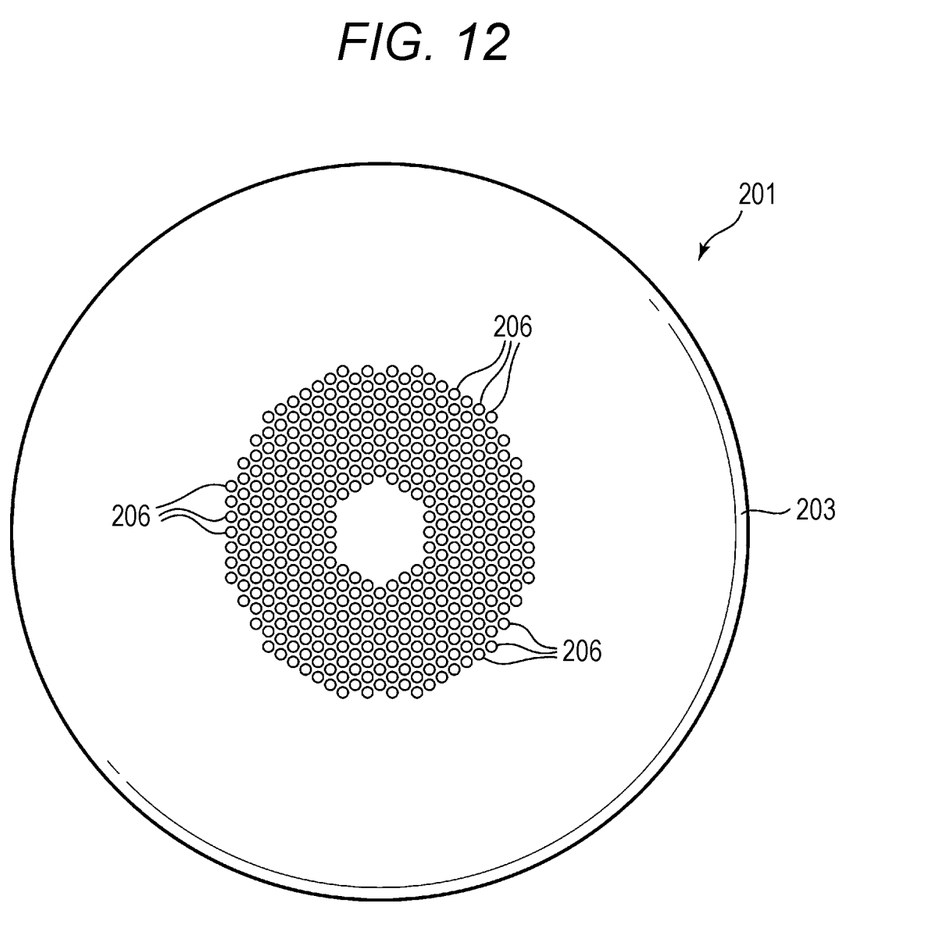
FIG. 12 is a front view of a spectacle lens of another form.

In the above embodiment, a case where convex segments 6 are formed in the center of the convex surface 3 of the spectacle lens 1 as shown in FIG. 1 is described; however, the form of the spectacle lens 1 is not limited to this. FIG. 12 is a front view of a spectacle lens of another form. As shown in FIG. 12, in a spectacle lens 201, no convex segments 206 are formed near the center of the convex surface 203, and a plurality of convex segments 206 are arranged in a circular ring configuration around the central portion. Even in such a spectacle lens 201, inspection can be performed according to the present disclosure.

Further, in the above embodiment, in step 101 and step 103 the design model 31 is set and a design convergence position is specified on the basis of the design model, and in step 113 whether the spectacle lens has prescribed optical character or not is evaluated using the design convergence position as a standard; however, the present disclosure is not limited to this. For example, it is possible to employ a procedure in which a design convergence position is specified for each of conditions such as the curvature radius of the convex segment and is recorded as a database in advance, and in step 113 a design convergence position in conformity with a condition is acquired with reference to the database and is used as a standard.

The following effects are exhibited by the present embodiment.

According to the present embodiment, in step 105 the shape of the convex surface 3 of the spectacle lens 1 produced is measured, in step 109 an actual device virtual model is set on the basis of the measured shape, in step 111 an actual device convergence position in the actual device virtual model is specified, and in step 113 the production precision of the spectacle lens is evaluated on the basis of the actual device convergence position; thereby, whether the spectacle lens has desired optical performance or not can be evaluated.

Further, according to the present embodiment, in step 101 a design model is set on the basis of design information of a spectacle lens, in step 103 a design convergence position in the design model is specified, and in step 113 the production precision of the spectacle lens is evaluated using the design convergence position as a standard; thereby, whether desired optical performance is correctly provided to the individual spectacle lens or not can be evaluated.

A method for evaluating the production precision of a spectacle lens of the present disclosure will now be summarized.

An Example of the present disclosure is a method for evaluating the production precision of a spectacle lens in which micro convex segments 6 protruding from the object side convex surface 3 on the object side of the spectacle lens 1 are formed on the convex surface 3, and includes a shape measurement step (step 105) of measuring the shape of the convex surface 3 of the spectacle lens 1, an actual device virtual model setting step (step 109) of setting the actual device virtual model 131 including the spectacle lens model 130 based on the measured shape and the eyeball model 132, an actual device convergence position specification step (step 111) of performing ray tracing calculation on the actual device virtual model 131 and specifying an actual device convergence position where light rays converge on the front side of the retina of the eyeball model 132, and an evaluation step (step 113) of evaluating the production precision of the spectacle lens on the basis of the actual device convergence position.

REFERENCE SIGNS LIST 1 spectacle lens
3 convex surface
4 concave surface
6 micro convex segment
8 hard coat layer
10 antireflection film
20 eyeball
20A retina
30 spectacle lens model
31 design model
32 eyeball model
32A retina
33 surface
36 convex segment
130 spectacle lens model
131 actual device virtual model
132 eyeball model
133 convex surface
134 concave surface
201 spectacle lens
203 convex surface
206 convex segment

The invention claimed is:

1. A method for evaluating production precision of a spectacle lens having micro convex segments that protrude from an object side surface on an object side of the spectacle lens, the method comprising:
   measuring a shape of the object side surface of the spectacle lens;
   specifying an actual device virtual model that includes a spectacle lens model, which is based on the measured shape, and an eyeball model;
   performing ray tracing calculation on the actual device virtual model to determine an actual device convergence position at which light rays converge on a front side of a retina of the eyeball model; and
   based on the actual device convergence position, evaluating a production precision of the spectacle lens.

2. The method for evaluating according to claim 1, further comprising:
   specifying a design model that includes a spectacle lens model, which is specified on the basis of design information, and an eyeball model; and
   performing ray tracing calculation on the design model to determine a design convergence position at which light rays converge on a front side of a retina of the eyeball model,
   wherein, the evaluating comprises determining whether a difference between the actual device convergence position and the design convergence position is within a prescribed permissible range.

3. The method for evaluating according to claim 2, wherein, in the specifying the design model, a model in which convex segments based on the design information are formed on an object side surface of a lens having no dioptric power is specified as the spectacle lens model.

4. The method for evaluating according to claim 1, wherein the spectacle lens is provided with a hard coat.

5. The method for evaluating according to claim 2, wherein the spectacle lens is provided with a hard coat.

6. The method for evaluating according to claim 5, wherein the spectacle lens is provided with an antireflective layer.

7. The method for evaluating according to claim 3, wherein the spectacle lens is provided with a hard coat.

8. A device for evaluating production precision of a spectacle lens having micro convex segments that protrude from an object side surface on an object side of the spectacle lens, the device comprising:
   a memory configured to store a measured shape of the object side surface of the spectacle lens; and a processor coupled to the memory and configured to perform a method comprising:
- specifying an actual device virtual model that includes a spectacle lens model, which is based on the measured shape, and an eyeball model;
- performing ray tracing calculation on the actual device virtual model to determine an actual device convergence position at which light rays converge on a front side of a retina of the eyeball model; and
- based on the actual device convergence position, evaluating a production precision of the spectacle lens.

9. The device according to claim 8, wherein the method further comprises:
- specifying a design model that includes a spectacle lens model, which is specified on the basis of design information, and an eyeball model; and
- performing ray tracing calculation on the design model to determine a design convergence position at which light rays converge on a front side of a retina of the eyeball model,
- wherein the evaluating comprises determining whether a difference between the actual device convergence position and the design convergence position is within a prescribed permissible range.

10. The device according to claim 9, wherein, in the specifying the design model, a model in which convex segments based on the design information are formed on an object side surface of a lens having no dioptric power is specified as the spectacle lens model.

11. The device according to claim 8, wherein the spectacle lens is provided with a hard coat.

12. The device according to claim 9, wherein the spectacle lens is provided with a hard coat.

13. The device according to claim 12, wherein the spectacle lens is provided with an antireflective layer.

14. The device according to claim 10, wherein the spectacle lens is provided with a hard coat.

15. A non-transitory computer-readable storage medium comprising code which, when executed by at least one processor, causes the at least one processor to perform a method for evaluating production precision of a spectacle lens having micro convex segments that protrude from an object side surface on an object side of the spectacle lens, the method comprising:
- specifying an actual device virtual model that includes a model of a spectacle lens, which is based on a measured shape of the object side surface of the spectacle lens, and an eyeball model;
- performing ray tracing calculation on the actual device virtual model to determine an actual device convergence position at which light rays converge on a front side of a retina of the eyeball model; and
- based on the actual device convergence position, evaluating a production precision of the spectacle lens.

16. The medium according to claim 15, wherein the method further comprises:
- specifying a design model that includes a spectacle lens model, which is specified on the basis of design information, and an eyeball model; and
- performing ray tracing calculation on the design model to determine a design convergence position at which light rays converge on a front side of a retina of the eyeball model,
- wherein the evaluating comprises determining whether a difference between the actual device convergence position and the design convergence position is within a prescribed permissible range.

17. The medium according to claim 16, wherein, in the specifying the design model, a model in which convex segments based on the design information are formed on an object side surface of a lens having no dioptric power is specified as the spectacle lens model.

18. The medium according to claim 15, wherein the spectacle lens is provided with a hard coat.

19. The medium according to claim 16, wherein the spectacle lens is provided with a hard coat.

20. The medium according to claim 17, wherein the spectacle lens is provided with a hard coat.

* * * * *